(12) United States Patent
Sato et al.

(10) Patent No.: US 9,791,287 B2
(45) Date of Patent: Oct. 17, 2017

(54) DRIVE ASSIST SYSTEM, METHOD, AND PROGRAM

(71) Applicant: AISIN AW CO., LTD., Anjo-shi, Aichi-ken (JP)

(72) Inventors: Yuji Sato, Okazaki (JP); Toshihiro Mori, Okazaki (JP); Koichi Nakao, Okazaki (JP)

(73) Assignee: AISIN AW CO., LTD., Anjo (JP)

( * ) Notice: Subject to any disclaimer, the term of this patent is extended or adjusted under 35 U.S.C. 154(b) by 37 days.

(21) Appl. No.: 14/901,145

(22) PCT Filed: Jun. 10, 2014

(86) PCT No.: PCT/JP2014/065321
§ 371 (c)(1),
(2) Date: Dec. 28, 2015

(87) PCT Pub. No.: WO2015/012010
PCT Pub. Date: Jan. 29, 2015

(65) Prior Publication Data
US 2016/0153802 A1 Jun. 2, 2016

(30) Foreign Application Priority Data
Jul. 23, 2013 (JP) .................. 2013-152302

(51) Int. Cl.
*G01C 21/36* (2006.01)
*G09B 29/00* (2006.01)

(52) U.S. Cl.
CPC ....... *G01C 21/3626* (2013.01); *G09B 29/007* (2013.01)

(58) Field of Classification Search
None
See application file for complete search history.

(56) References Cited

U.S. PATENT DOCUMENTS 5,638,279 A * 6/1997 Kishi ................ G01C 21/3632
340/990
5,884,218 A 3/1999 Nimura et al.
(Continued)

FOREIGN PATENT DOCUMENTS

JP H10132598 A 5/1998
JP 2003215228 A 7/2003
(Continued)

OTHER PUBLICATIONS

Sep. 22, 2014 Search Report issued in International Patent Application No. PCT/JP2014/065321.

*Primary Examiner* — Truc M Do
(74) *Attorney, Agent, or Firm* — Oliff PLC

(57) ABSTRACT

Drive assist systems, methods, and programs display, on a display, an image in which a destination location icon that indicates a destination location is superimposed on a scene in front of a mobile body. The systems, methods, and programs acquire a length of a frontage of the destination location along a road on which the mobile body is present and specify a display position of the destination location icon on the basis of an estimated position of the mobile body such that the display position of the destination location icon is a position within the frontage. The systems, methods, and programs display on the display, an image in which the destination location icon is superimposed on the display position of the destination location icon in the scene in front of the mobile body.

8 Claims, 4 Drawing Sheets

(56) References Cited

U.S. PATENT DOCUMENTS

| | | | |
|---|---|---|---|
| 7,590,487 B2* | 9/2009 | De Silva | G01C 21/3635 340/995.1 |
| 7,733,244 B2 | 6/2010 | Asada | |
| 7,865,302 B2* | 1/2011 | Hatazawa | G01C 21/3673 701/426 |
| 8,204,684 B2* | 6/2012 | Forstall | G01C 21/20 455/456.1 |
| 8,423,292 B2* | 4/2013 | Geelen | G01C 21/3647 340/995.2 |
| 9,026,353 B2* | 5/2015 | Tashiro | G01C 21/3658 701/400 |
| 9,470,546 B2* | 10/2016 | Nakahara | G01C 21/3679 |
| 2002/0188400 A1* | 12/2002 | Sato | G01C 21/3415 701/455 |
| 2005/0027437 A1* | 2/2005 | Takenaga | G08G 1/0969 701/117 |
| 2005/0107952 A1* | 5/2005 | Hoshino | G08G 1/0969 701/431 |
| 2005/0251334 A1 | 11/2005 | Mizuno | |
| 2006/0271284 A1* | 11/2006 | Watanabe | G01C 21/367 701/431 |
| 2007/0233370 A1* | 10/2007 | Asada | G01C 21/3602 701/431 |
| 2007/0239347 A1* | 10/2007 | Watanabe | G01C 21/28 701/469 |
| 2008/0167804 A1* | 7/2008 | Geelen | G01C 21/3655 701/408 |
| 2008/0195315 A1* | 8/2008 | Hu | G01C 21/3647 701/455 |
| 2008/0208453 A1* | 8/2008 | Fujimoto | G01C 21/3446 701/533 |
| 2009/0240426 A1* | 9/2009 | Akita | G01C 21/3647 701/533 |
| 2009/0287410 A1* | 11/2009 | Kobayashi | G01C 21/30 701/533 |
| 2010/0138146 A1* | 6/2010 | Vogt | G01C 21/3632 701/533 |
| 2010/0161207 A1* | 6/2010 | Do | H04W 4/02 701/532 |
| 2010/0217524 A1* | 8/2010 | Oohashi | G01S 19/49 701/472 |
| 2010/0250113 A1* | 9/2010 | Miyata | G01C 21/3635 701/533 |
| 2010/0250116 A1 | 9/2010 | Yamaguchi et al. | |
| 2011/0243379 A1* | 10/2011 | Miyajima | G01C 21/28 382/103 |
| 2013/0013200 A1* | 1/2013 | Sato | G01C 21/3626 701/516 |
| 2013/0170706 A1* | 7/2013 | Mori | G01C 21/3602 382/103 |
| 2013/0253750 A1* | 9/2013 | Otake | B60W 10/06 701/22 |
| 2014/0067256 A1* | 3/2014 | Aoki | G01C 21/30 701/417 |
| 2014/0163877 A1* | 6/2014 | Kiyama | G01C 21/3469 701/533 |
| 2014/0285331 A1* | 9/2014 | Otake | G08G 1/16 340/435 |

FOREIGN PATENT DOCUMENTS

| | | |
|---|---|---|
| JP | 2005308543 A | 11/2005 |
| JP | 2007067487 A | 3/2007 |
| JP | 2008202987 A | 9/2008 |
| JP | 2011154041 A | 8/2011 |
| JP | 2013072778 A | 4/2013 |

* cited by examiner

DRIVE ASSIST SYSTEM, METHOD, AND PROGRAM

TECHNICAL FIELD

Related technical fields include drive assist systems, methods, and programs.

BACKGROUND ART

There has hitherto been known a technology for causing a user to focus on a destination location by superimposing a predetermined icon on a location within a scenic image that illustrates a scene in front of a vehicle in the case where an image of the destination location is included in the scenic image. For example, Japanese Patent Application Publication No. 2011-154041 (JP 2011-154041 A) discloses a technology for combining an image of an arrow that points to a target scene position with an image captured using a camera.

SUMMARY

In the related art discussed above, the target scene position within the image captured using the camera is specified on the basis of the current location of the vehicle. Thus, the target scene position within the image depends on the current location of the vehicle. In a technology for specifying the current location of a vehicle, however, occurrence of an error in position is unavoidable. Therefore, in the case where an error has occurred, the arrow pointing to the target scene position may be displayed at a position that is different from the target scene position, in which case the user may be misled. In particular, in the case where the arrow pointing to the target scene position is displayed farther than the target scene position, the user driving the vehicle utilizing the arrow pointing to the target scene position may pass by the destination location.

Exemplary embodiments of the broad inventive principles described herein provide a technology that can suppress occurrence of a situation in which a destination location is passed by in a configuration in which a destination location icon that indicates a destination location is superimposed on a scene.

According to exemplary embodiments, the drive assist system is a navigation system that displays, on a display section, an image in which a destination location icon that indicates a destination location is superimposed on a scene in front of a mobile body, including: frontage length acquisition means for acquiring a length of a frontage of the destination location along a road on which the mobile body is present; maximum error acquisition means for acquiring a maximum error which is a maximum value of an error between an estimated position and an actual position of the mobile body that may be caused in a direction of the road on which the mobile body is present; display position specifying means for specifying a display position of the destination location icon on the basis of the estimated position of the mobile body such that the display position of the destination location icon is a position within the frontage in the case where the error is zero, and such that the display position of the destination location icon is a position within the frontage or a position nearer than the destination location in the case where the error is the maximum error; and image display means for displaying, on the display section, an image in which the destination location icon is superimposed on the display position of the destination location icon in the scene in front of the mobile body.

According to exemplary embodiments, the drive assist method is a drive assist method for displaying, on a display section, an image in which a destination location icon that indicates a destination location is superimposed on a scene in front of a mobile body, including: a frontage length acquisition step of acquiring a length of a frontage of the destination location along a road on which the mobile body is present; a maximum error acquisition step of acquiring a maximum error which is a maximum value of an error between an estimated position and an actual position of the mobile body that may be caused in a direction of the road on which the mobile body is present; a display position specifying step of specifying a display position of the destination location icon on the basis of the estimated position of the mobile body such that the display position of the destination location icon is a position within the frontage in the case where the error is zero, and such that the display position of the destination location icon is a position within the frontage or a position nearer than the destination location in the case where the error is the maximum error; and an image display step of displaying, on the display section, an image in which the destination location icon is superimposed on the display position of the destination location icon in the scene in front of the mobile body.

According to exemplary embodiments, the drive assist program is a drive assist program for causing a computer to implement a function of displaying, on a display section, an image in which a destination location icon that indicates a destination location is superimposed on a scene in front of a mobile body, the drive assist program causing the computer to implement: a frontage length acquisition function of acquiring a length of a frontage of the destination location along a road on which the mobile body is present; a maximum error acquisition function of acquiring a maximum error which is a maximum value of an error between an estimated position and an actual position of the mobile body that may be caused in a direction of the road on which the mobile body is present; a display position specifying function of specifying a display position of the destination location icon on the basis of the estimated position of the mobile body such that the display position of the destination location icon is a position within the frontage in the case where the error is zero, and such that the display position of the destination location icon is a position within the frontage or a position nearer than the destination location in the case where the error is the maximum error; and an image display function of displaying, on the display section, an image in which the destination location icon is superimposed on the display position of the destination location icon in the scene in front of the mobile body.

That is, in a configuration in which the position of the destination location within the image is specified on the basis of the estimated position of the mobile body and the destination location icon is superimposed on the position, the destination location icon is displayed at a position displaced from the intended position if an error is caused toward the front side or the rear side of the road on which the mobile body is present. In this case, the destination location icon may be displayed outside the frontage of the destination location, depending on the magnitude of the error. Thus, in the drive assist system, the drive assist method, and the drive assist program discussed above, the display position of the destination location icon is specified on the basis of the estimated position of the mobile body such that the display position of the destination location icon is a position within the frontage in the case where the error is zero, and such that the display position of the destination location icon is a position within the frontage or a position nearer than the destination location in the case where the error is the maximum error. According to the configuration, the destination location icon is displayed at a position within the frontage in the case where the error is zero, and the display position of the destination location icon is a position within the frontage of the destination location or a position nearer than the destination location even if the error is the maximum error. Thus, the destination location icon is not displayed at a position farther than the destination location, which suppresses occurrence of a situation in which the destination location is passed by.

EXEMPLARY EMBODIMENTS

An embodiment will be described below in the following order:
(1) Configuration of Navigation System
(2) Drive Assist Process
(3) Other Embodiments

(1) Configuration of Navigation System

Figure 1:
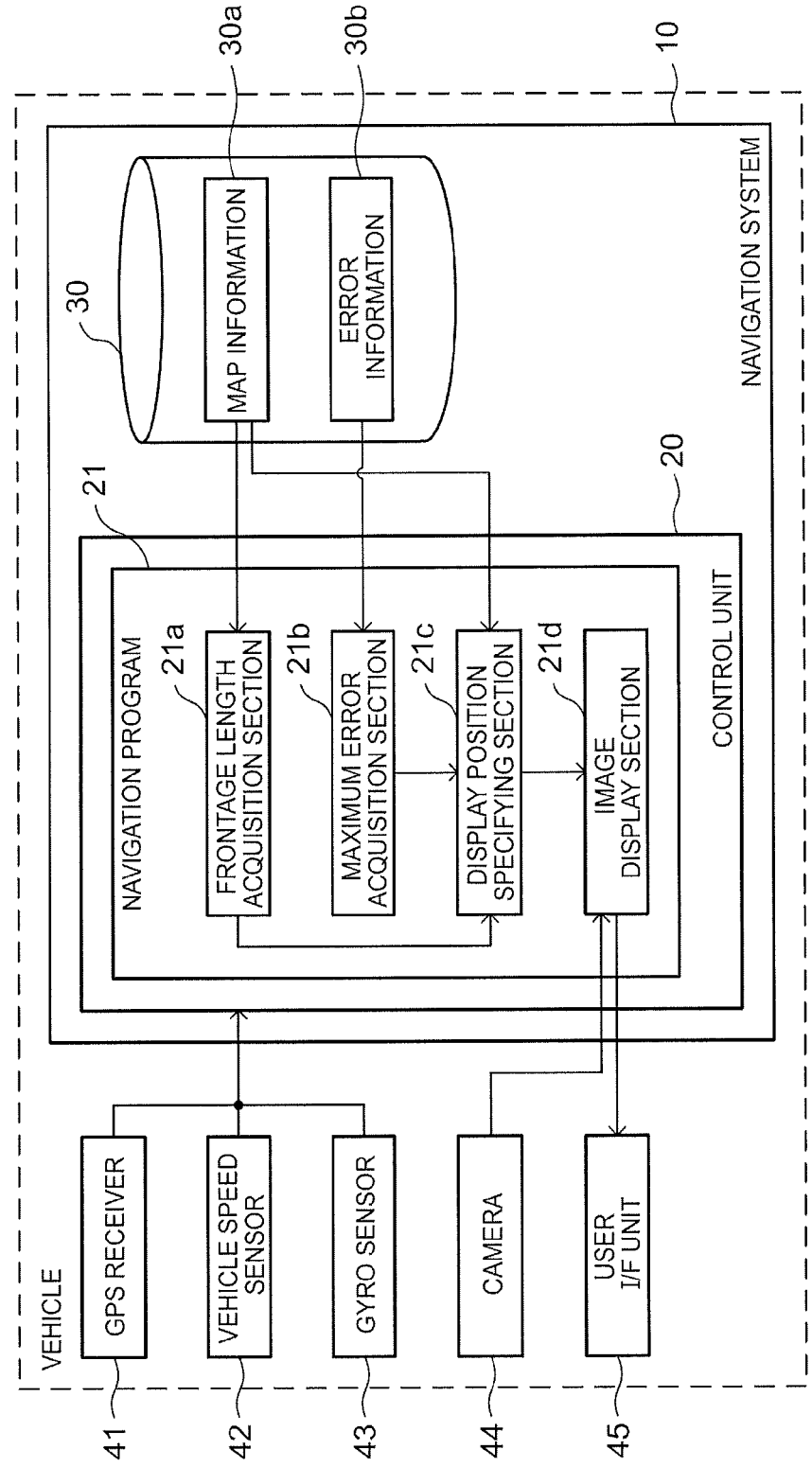
FIG. 1 is a block diagram illustrating a navigation system that includes a drive assist system.

FIG. 1 is a block diagram illustrating the configuration of a navigation system 10 that includes a drive assist system. The navigation system 10 is provided in a vehicle that serves as a mobile body, and includes a control unit 20 that includes a CPU, a RAM, a ROM, and so forth and a storage medium 30. (As used herein the term "storage medium" does not encompass transitory signals.) The navigation system 10 can execute a program such as a navigation program 21 stored in the storage medium 30 or the ROM using the control unit 20.

In addition, the vehicle according to the embodiment includes a GPS receiver 41, a vehicle speed sensor 42, a gyro sensor 43, a camera 44, and a user I/F unit 45. The GPS receiver 41 receives radio waves from GPS satellites to output a signal indicating a signal for calculating an estimated position of the vehicle via an interface (not illustrated). The vehicle speed sensor 42 outputs a signal corresponding to the rotational speed of wheels of the vehicle. The control unit 20 acquires the signal via an interface (not illustrated) to acquire the vehicle speed. The gyro sensor 43 detects the angular acceleration of gyration of the vehicle in a horizontal plane to output a signal corresponding to the direction of the vehicle. The control unit 20 acquires information output from the vehicle speed sensor 42, the gyro sensor 43, etc. as autonomous navigation information.

The navigation program 21 can cause the control unit 20 to execute a function of performing a map matching process on the basis of the autonomous navigation information to specify an estimated position of the vehicle (an estimated position of the navigation system 10) on a road and display the estimated position on a map. Further, the navigation program 21 can cause the control unit 20 to execute a function of searching for a scheduled route from the estimated position to a destination location set by a user, and guiding the vehicle along the scheduled route while displaying a map around the estimated position and the scheduled route on a display section to guide the user to the destination location.

Then, through processing performed by the navigation program 21, the control unit 20 sets a plurality of comparison target roads, on which the estimated position of the vehicle may be present, on the basis of the autonomous navigation information output from the vehicle speed sensor 42 and the gyro sensor 43 and map information 30a, narrows down the comparison target roads on the basis of an error circle of GPS signals acquired by the GPS receiver 41, performs a map matching process in which a road for which the shape of the comparison target road and the autonomous navigation track best match each other is considered as the road on which the vehicle is traveling, and specifies the estimated position on the road specified through the map matching process.

The storage medium 30 stores the map information 30a and error information 30b in advance. The map information 30a is information utilized to specify the position of the vehicle and a guide target facility, and includes node data indicating the positions etc. of nodes set on roads on which the vehicle travels, shape interpolation point data indicating the positions etc. of shape interpolation points for specifying the shape of the roads between the nodes, link data indicating coupling between the nodes, facility data indicating facilities existing on or around the roads, and so forth. In the embodiment, the facility data are correlated with information such as the type of the facilities, the position of the facilities (in the embodiment, the point at the center of the site on which the facilities are present), and the name of the facilities.

Further, site shape data which are information indicating the shape of the site of the facilities are correlated with some of the facilities (e.g. facilities decided in advance as facilities that are highly likely to be set as the destination location). In the embodiment, the site shape data are polygon data for expressing the shape of the site on which the destination location is present and the shape of a building on the site using a plurality of polygons. That is, the site shape data are data that indicate polygons formed by dividing the site and the surface of the building, and data that indicate the shape of the polygons and the relative position of the polygons with respect to a reference position (the position of the facility prescribed in the map information 30a). Thus, the control unit 20 can dispose polygons in a virtual three-dimensional space in accordance with the data to reproduce the shape of the site on which the destination location is present and the shape of the building on the site.

In addition, the map information 30a includes information on the length of the frontage correlated with each of the types of the plurality of facilities. Specifically, the map information 30a includes information in which 20 m, 30 m, 40 m, 60 m, and 10 m are correlated with the convenience store, gas station, supermarket, department store, and other facilities, respectively. The error information 30b is information that indicates a maximum error, which is the maximum value of an error between the estimated position acquired through processing performed by the navigation program 21 and the actual position of the vehicle, and which is the maximum value of an error that may be caused in the direction of the road on which the vehicle is present. That is, in the technology for specifying an estimated position of the vehicle through the map matching process discussed above etc., the estimated position and the actual position may be different from each other, and an error may be caused in the direction of the road on which the vehicle is present in accordance with the difference between the positions. The maximum value of the error can be estimated in advance.

For example, the accuracy in estimated position is varied in accordance with the status of reception of GPS signals by the GPS receiver 41 (the intensity of the signals, the number of satellites from which the signals can be acquired, and the surrounding buildings) etc. In addition, in the case where the map matching process is performed on the basis of the estimated position estimated using the vehicle speed sensor 42 and the gyro sensor 43, it can be considered that the accuracy in estimated position is increasingly reduced as the elapsed time after passage through a specific road shape (such as a curve) is longer. Further, in a configuration in which a known feature (such as a paint on the road surface) is captured using a camera and an estimated position of the vehicle is specified on the basis of the captured image, it can be considered that the accuracy in estimated position is increasingly reduced as the elapsed time after the estimated position is specified is longer. Thus, the maximum value of the error can be estimated in advance on the basis of such various types of factors of the error.

An error may be caused toward either the front or the rear in the direction of the road on which the vehicle is present. In general, however, it is often not clear in what direction an error is caused. In this case, preferably, only the magnitude of the error is defined without prescribing the direction of the error on the road on which the vehicle is present. Thus, in the embodiment, the maximum value of an error caused in the front-rear direction of the road on which the vehicle is present is specified in accordance with the estimation discussed above, and the maximum error with a fixed value is defined in accordance with only the magnitude of the error without prescribing the direction. For example, in the case where the maximum error is 1 m, it is assumed that there is an error of up to 1 m toward either the front or the rear in the direction of the road on which the vehicle is present.

The camera 44 is attached to the ceiling portion inside the windshield of the vehicle, and captures a scene in front of the vehicle at intervals of a constant period to generate and output image information that indicates the captured scene. The control unit 20 can acquire the image information output from the camera 44 to perform image analysis, image processing for display on the display section, and so forth. The user I/F unit 45 is an interface section that provides various kinds of information to a driver, and includes the display section, a speaker, an input section, and so forth (not illustrated). The control unit 20 can output the image information on the image which indicates the scene captured using the camera 44 to the display section to cause the display section to display the scene. In addition, the control unit 20 can generate image information in which a desired image (such as a guide image) is superimposed on the image information on the scene and output the resulting image information to the display section to superimpose the desired image on the scene and display the resulting image.

Through the function of the navigation program 21 (not illustrated), the control unit 20 receives input of a destination location by the driver via the input section of the user I/F unit 45, and searches for a scheduled route from the current location of the vehicle to the destination location. In addition, through the function of the navigation program 21, the control unit 20 can provide the driver of the vehicle with a route guidance that indicates the scheduled route. In the embodiment, the navigation program 21 can cause the control unit 20 to execute a function of superimposing a destination location icon that indicates the destination location on an image that illustrates a scene in front of the vehicle at a location around the destination location to display the resulting image on the display section of the user I/F unit 45. In order to implement such a function, the navigation program 21 includes a frontage length acquisition section 21*a*, a maximum error acquisition section 21*b*, a display position specifying section 21*c*, and an image display section 21*d*.

The frontage length acquisition section 21*a* is a module that causes the control unit 20 to execute a function of acquiring the length of the frontage of the destination location along the road on which the vehicle is present. That is, the control unit 20 acquires the length of the frontage of a facility set as the destination location by the user. In the embodiment, site shape data are correlated with some of the facilities. Thus, in the case where the site shape data are correlated with the facility at the destination location, the control unit 20 references the site shape data to acquire the length of the frontage of the destination location. In the case where the site shape data are not correlated with the facility at the destination location, on the other hand, the control unit 20 acquires the type of the facility at the destination location on the basis of the facility data included in the map information 30*a*. Further, the control unit 20 references the information on the length of the frontage correlated with each of the types of the facilities to acquire the length of the frontage for the type of the facility at the destination location.

The maximum error acquisition section 21*b* is a module that causes the control unit 20 to implement a function of acquiring the maximum error which is the maximum value of an error between the estimated position and the actual position of the vehicle that may be caused in the direction of the road on which the vehicle is present. That is, through processing performed by the maximum error acquisition section 21*b*, the control unit 20 references the error information 30*b* to acquire the maximum error.

The display position specifying section 21*c* is a module that causes the control unit 20 to implement a function of specifying the display position of the destination location icon on the basis of the estimated position of the vehicle such that the display position of the destination location icon is a position within the frontage in the case where the error is zero, and such that the display position of the destination location icon is a position within the frontage or a position nearer than the destination location in the case where the error is the maximum error. In the embodiment, when superimposing a destination location icon that indicates the destination location on an image that illustrates a scene in front of the vehicle at a location around the destination location, the vehicle is prevented from passing by the destination location with the display position of the destination location icon displaced from the intended position.

That is, in a configuration in which the display position is specified such that the destination location icon is displayed within the frontage of the destination location on the basis of the estimated position of the vehicle and the position of the destination location indicated in the map information 30*a*, the destination location icon is displayed within the frontage of the destination location if no error is caused between the estimated position and the actual position of the vehicle. In this case, there is a low possibility that the user who is heading for the destination location on the basis of the display passes by the destination location.

In the case where an error is caused between the estimated position and the actual position of the vehicle, however, the display position of the destination location icon is not located at the intended position, and displaced in the front-rear direction of the road on which the vehicle is present. Thus, by specifying the display position of the destination location icon on the basis of the estimated position of the vehicle such that the display position of the destination location icon is a position within the frontage or a position nearer than the destination location in the case where the error is the maximum error, it is possible to suppress the possibility that the destination location icon is displayed at a position farther than the destination location in the case where the error is the maximum error.

Thus, the control unit 20 specifies the display position of the destination location icon on the basis of the estimated position of the vehicle such that the display position of the destination location icon is a position within the frontage in the case where the error is zero, and such that the display position of the destination location icon is a position within the frontage or a position nearer than the destination location in the case where the error is the maximum error. The display position is specified as a coordinate in the actual space.

The image display section 21d is a module that causes the control unit 20 to execute a function of displaying an image in which the destination location icon is superimposed on the display position of the destination location icon in the scene in front of the vehicle. That is, the display position of the destination location icon is specified as a coordinate in the actual space, and therefore the control unit 20 analyzes which pixel the display position of the destination location icon corresponds to in the image which illustrates the scene in front of the vehicle and which is captured using the camera 44. Specifically, in the embodiment, the distance in the actual space between the road captured at a pixel at a desired position and the vehicle in the image included in the scene captured using the camera 44 has been specified in advance from the viewing angle of the camera 44, and the pixel and the distance have been correlated in advance with each other.

Thus, the control unit 20 specifies the distance between the display position acquired through processing performed by the display position specifying section 21c and the vehicle to specify a pixel corresponding to the distance on the boundary line between the road and the destination location. Then, the control unit 20 generates a control signal for displaying an image which is captured using the camera 44 and in which a destination location icon in a shape decided in advance is superimposed on the pixel, and outputs the control signal to the display section of the user I/F unit 45. As a result, an image in which the destination location icon is superimposed on the image captured using the camera 44 is displayed on the display section of the user I/F unit 45.

In the configuration described above, the destination location icon is displayed at a position within the frontage in the case where the error between the estimated position and the actual position of the vehicle is zero, and the display position of the destination location icon is a position within the frontage of the destination location or a position nearer than the destination location even if the error is the maximum error. Thus, the destination location icon is not displayed at a position farther than the destination location, which suppresses occurrence of a situation in which the destination location is passed by. In the embodiment, the near side indicates the rear side in the travel direction of the vehicle on the road on which the vehicle is present, and the far side indicates the front side in the travel direction of the vehicle on the road on which the vehicle is present.

(2) Drive Assist Process

Figure 2:
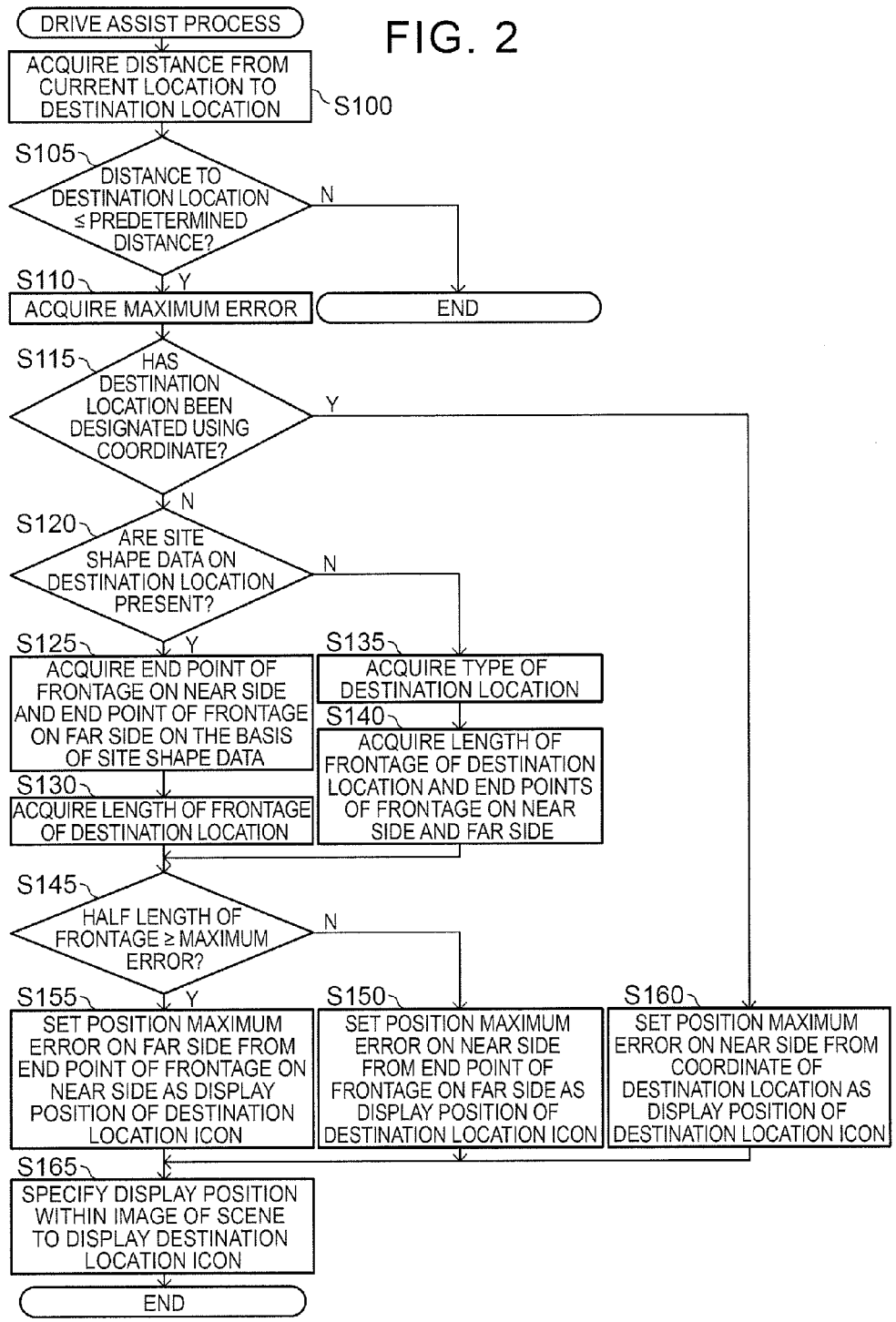
FIG. 2 is a flowchart illustrating a drive assist process.
Figure 3:
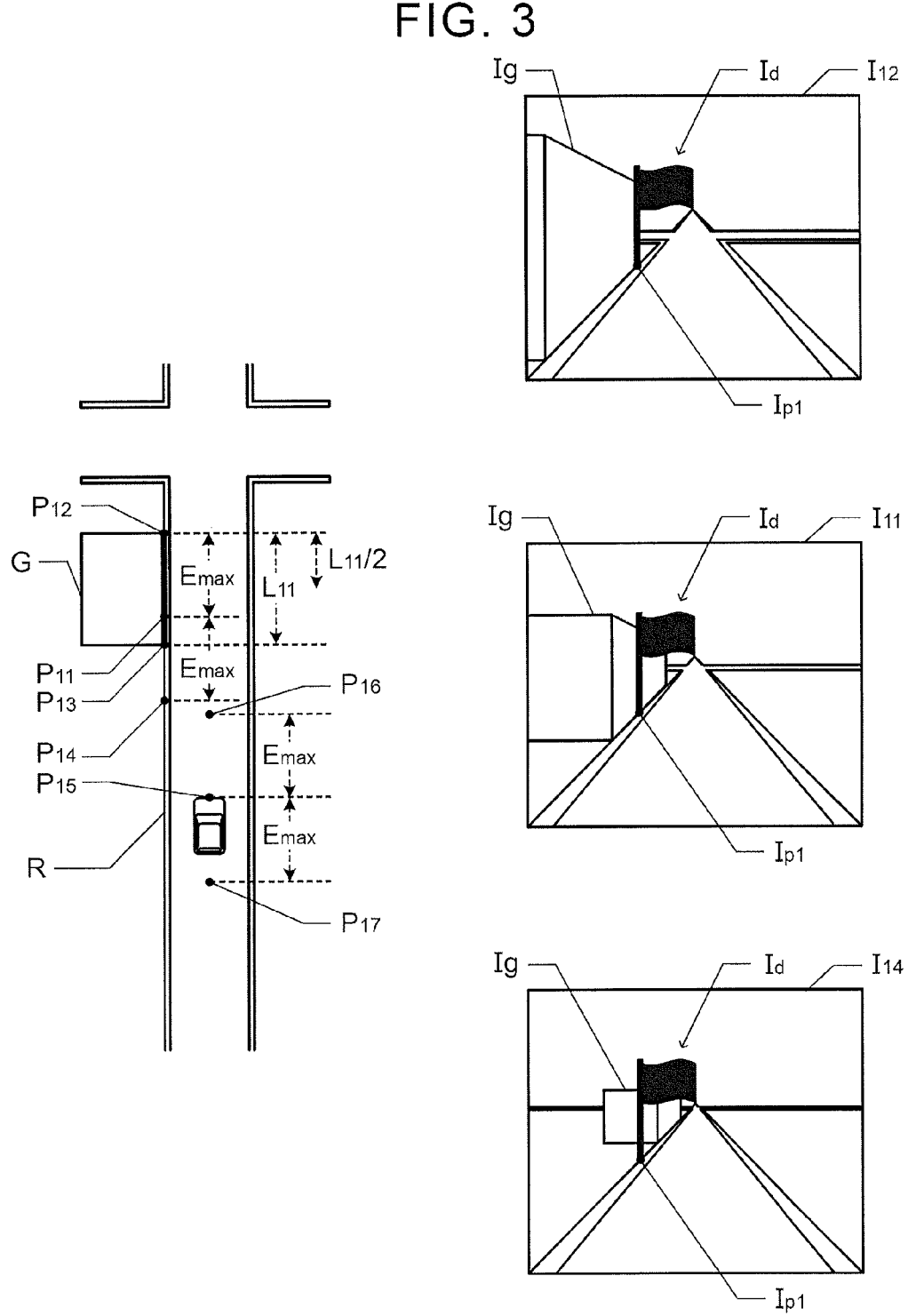
FIG. 3 illustrates examples of the positional relationship between a vehicle and a destination location and a display image.
Figure 4:
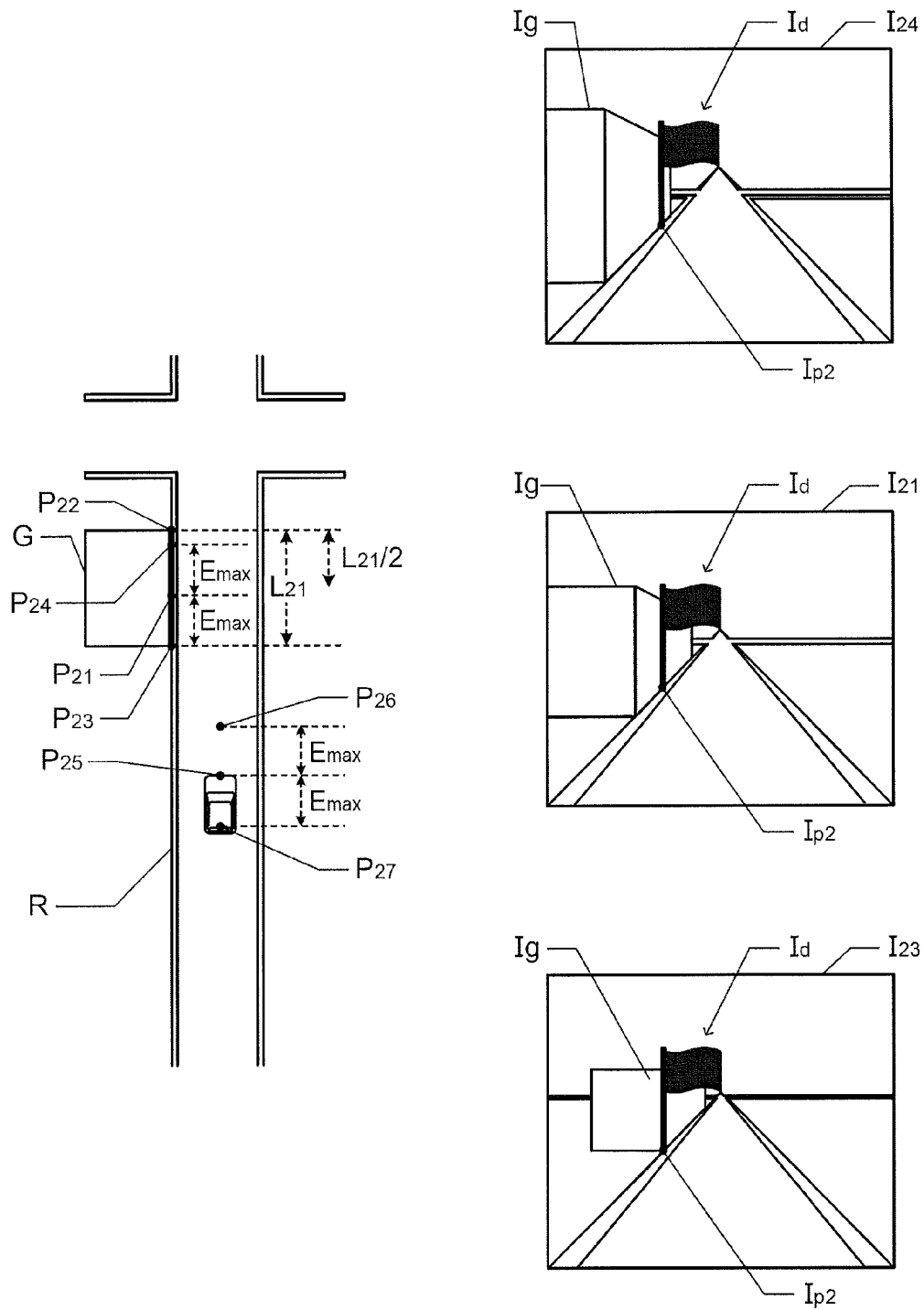
FIG. 4 illustrates examples of the positional relationship between the vehicle and the destination location and the display image.

Next, a drive assist process performed by the navigation program 21 will be described. FIG. 2 is a flowchart illustrating the drive assist process executed by the navigation program 21. FIGS. 3 and 4 illustrate an example of a road R on which the vehicle is present on the left side, and illustrate examples of an image that may be displayed on the display section at a location on the road R on the right side. The drive assist process illustrated in FIG. 2 will be described with reference to the examples illustrated in FIGS. 3 and 4 as appropriate. In the embodiment, through processing performed by the navigation program, the drive assist process is executed at intervals of a predetermined period (e.g. 100 ms) after the control unit 20 receives setting of a destination location and decides a scheduled route to the destination location. In the embodiment, the destination location can be set by designating a facility, and may be set using a desired coordinate (latitude and longitude) in the actual space.

When the drive assist process is started, through processing performed by the navigation program 21, the control unit 20 acquires the distance from the current location to the destination location (step S100). That is, the control unit 20 specifies the current location of the vehicle on the basis of the signals output from the GPS receiver 41, the vehicle speed sensor 42, and the gyro sensor 43 and the map information 30a. In the case where the destination location has been set by designating a facility, the control unit 20 references facility data on the facility at the destination location included in the map information 30a to specify the position of the facility as the destination location. In the case where the destination location has been set using a coordinate in the actual space, on the other hand, the control unit 20 specifies the position at the coordinate as the destination location. Then, the control unit 20 acquires the distance between the current location of the vehicle and the destination location. FIGS. 3 and 4 illustrate an example in which a facility G at the destination location is present along the road R on which the vehicle is present.

Next, through processing performed by the navigation program 21, the control unit 20 determines whether or not the distance to the destination location is equal to or less than a predetermined distance (step S105). In the case where it is not determined that the distance to the destination location is equal to or less than the predetermined distance, the control unit 20 ends the drive assist process. In the embodiment, the drive assist process is executed at intervals of the predetermined period. Therefore, steps S100 and S105 are repeatedly performed until it is determined that the distance to the destination location is equal to or less than the predetermined distance.

In the case where it is determined in step S105 that the distance to the destination location is equal to or less than the predetermined distance, on the other hand, through processing performed by the maximum error acquisition section 21b, the control unit 20 acquires the maximum error (step S110). That is, the control unit 20 references the error information 30b to acquire the maximum error.

Next, through processing performed by the display position specifying section 21c, the control unit 20 determines whether or not the destination location has been designated using a coordinate (step S115). In the case where it is not determined in step S115 that the destination location has been designated using a coordinate, that is, in the case where the destination location has been set by designating a facility, through processing performed by the display position specifying section 21c, the control unit 20 determines whether or not site shape data on the destination location are present (step S120). That is, the control unit 20 determines that site shape data on the destination location are present in the case where site shape data correlated with the facility set as the destination location are included in the map information 30a.

In the case where it is determined in step S120 that site shape data on the destination location are present, through processing performed by the display position specifying section 21c, the control unit 20 acquires an end point of the frontage on the near side and an end point of the frontage on the far side on the basis of the site shape data (step S125). That is, the relationship between the unit distance in the virtual three-dimensional space assumed in the embodiment and the unit distance in the actual space has been decided in advance, and the control unit 20 specifies the shape of the site of the facility in the virtual three-dimensional space on the basis of the site shape data to specify the end points of the frontage to specify the positions of the end points of the frontage in the actual space.

Specifically, the control unit 20 sets the position of the facility as the destination location to a desired position in the virtual three-dimensional space. Further, the control unit 20 disposes the polygons indicated in the site shape data in the virtual three-dimensional space with reference to the position of the facility to reproduce the shape of the site at the destination location and the shape of a building on the site in the virtual three-dimensional space. The periphery of the shape of a site is a boundary line between a road and a facility. Therefore, the control unit 20 specifies a boundary line along the road on which the vehicle is present, among the boundary lines of the site, and acquires an end point of the boundary line positioned on the rear side in the travel direction of the road as the end point on the near side, and acquires an end point of the boundary line positioned on the front side as the end point on the far side.

Then, the control unit 20 specifies the position (coordinate), in the actual space, of the facility as the destination location on the basis of the map information 30a, and specifies the positions of the end point on the near side and the end point on the far side in the actual space from the relationship between the unit distance in the virtual three-dimensional space and the unit distance in the actual space. For example, the site of the destination location G indicated along the road R on the left side in FIGS. 3 and 4 has a rectangular shape, and a boundary line formed with the road R and a side of the rectangle contacting each other forms the frontage (thick line). When step S125 is executed in such examples, in FIG. 3, the position of an end point $P_{13}$ on the near side is acquired in the actual space, and the position of an end point $P_{12}$ on the far side is acquired in the actual space. In FIG. 4, the position of an end point $P_{23}$ on the near side is acquired in the actual space, and the position of an end point $P_{22}$ on the far side is acquired in the actual space.

Next, through processing performed by the frontage length acquisition section 21a, the control unit 20 acquires the length of the frontage of the destination location (step S130). That is, the control unit 20 acquires the distance between the end points in the actual space acquired in step S125 as the length of the frontage. For example, a distance $L_{11}$ between the end points $P_{13}$ and $P_{12}$ is acquired in FIG. 3, and a distance $L_{21}$ between the end points $P_{23}$ and $P_{22}$ is acquired in FIG. 4.

In the case where it is not determined in step S120 that site shape data on the destination location are present, through processing performed by the display position specifying section 21c, the control unit 20 acquires the type of the destination location (step S135). That is, the control unit 20 references the facility data on the facility at the destination location included in the map information 30a to acquire the type of the facility as the destination location.

Next, through processing performed by the frontage length acquisition section 21a and the display position specifying section 21c, the control unit 20 acquires the length of the frontage of the destination location and the end points of the frontage on the near side and the far side (step S140). That is, through processing performed by the frontage length acquisition section 21a, the control unit 20 references the information on the length of the frontage correlated with each of the types of the plurality of facilities included in the map information 30a to specify the length of the frontage correlated with the type of the destination location acquired in step S135 to acquire the length as the length of the frontage of the destination location. For example, in the case where the type of the destination location G illustrated in FIG. 3 is the convenience store, the control unit 20 acquires 20 m as the length $L_{11}$ of the frontage of the destination location G. Further, through processing performed by the display position specifying section 21c, the control unit 20 acquires the position of the facility as the destination location on the basis of the facility data in the map information 30a to consider a position at which a perpendicular that extends from the position of the facility to the boundary line of the road crosses the boundary line of the road as the center of the frontage of the destination location. Then, the control unit 20 specifies positions half the length of the frontage away from the center of the frontage toward the far side and the near side as the end points of the frontage.

Next, through processing performed by the display position specifying section 21c, the control unit 20 determines whether or not half the length of the frontage is equal to or more than the maximum error (step S145). Then, in the case where it is not determined in step S145 that half the length of the frontage is equal to or more than the maximum error, that is, in the case where half the length of the frontage is less than the maximum error, through processing performed by the display position specifying section 21c, the control unit 20 sets a position the maximum error on the near side from the end point of the frontage on the far side as the display position of the destination location icon (step S150). For example, in the example illustrated in FIG. 3, the maximum error is $E_{max}$, and half the length $L_{11}$ of the frontage is less than the maximum error $E_{max}$. Thus, in the example, a position $P_{11}$ the maximum error $E_{max}$ on the near side from the end point $P_{12}$ of the frontage on the far side is set as the display position of the destination location icon.

In the case where it is not determined in step S145 that half the length of the frontage is equal to or more than the maximum error, on the other hand, through processing performed by the display position specifying section 21c, the control unit 20 sets a position the maximum error on the far side from the end point of the frontage on the near side as the display position of the destination location icon (step S155). For example, in the example illustrated in FIG. 4, the maximum error is $E_{max}$, and half the length $L_{21}$ of the frontage is less than the maximum error $E_{max}$. Thus, in the example, a position $P_{21}$ the maximum error $E_{max}$ on the far side from the end point $P_{21}$ of the frontage on the near side is set as the display position of the destination location icon.

In the case where it is determined in step S115 that the destination location has been designated using a coordinate, through processing performed by the display position specifying section 21c, the control unit 20 sets a position the maximum error on the near side from the coordinate of the destination location as the display position of the destination location icon (step S160). That is, in the case where the destination location has been designated using a coordinate, the destination location is not necessarily a facility. Therefore, in order to suppress the possibility that the destination location is passed by, the control unit 20 sets a position the maximum error on the near side from the coordinate of the destination location as the display position of the destination location icon.

When the display position of the destination location icon is set in any one of steps S150, S155, and S160, through processing performed by the image display section 21d, the control unit 20 specifies the display position within the image of the scene to display the destination location icon (step S165). That is, in steps S150, S155, and S160, the display position of the destination location icon is specified using a coordinate in the actual space. In addition, the distance in the actual space between the road captured at a pixel at a desired position and the vehicle in the image included in the scene captured using the camera 44 has been specified in advance from the viewing angle of the camera 44, and the pixel and the distance have been correlated with each other in advance.

Thus, the control unit 20 acquires the current location of the vehicle on the basis of the signals output from the GPS receiver 41, the vehicle speed sensor 42, and the gyro sensor 43, and acquires the distance between the current location of the vehicle and the display position of the destination location icon. Further, the control unit 20 executes predetermined image processing (such as a Hough transform) on the basis of the image which illustrates the scene in front of the vehicle and which is captured using the camera 44 to specify a pixel on the boundary line between the destination location and the road. In addition, the control unit 20 acquires a pixel that is on the boundary line and that is correlated with the distance between the current location of the vehicle and the display position of the destination location icon to specify the pixel as a pixel at which the destination location icon should be displayed.

Then, the control unit 20 generates a control signal for displaying an image which is captured using the camera 44 and in which a destination location icon in a shape decided in advance is superimposed on the pixel, and outputs the control signal to the display section of the user I/F unit 45. As a result, an image in which the destination location icon is superimposed on the image captured using the camera 44 is displayed on the display section of the user I/F unit 45. In the embodiment, the size of the destination location icon is prescribed in advance for each pixel such that the size of the destination location icon becomes larger as the pixel on which the destination location icon is superimposed is closer to the lower side of the image (the image illustrated in the pixel is closer to the vehicle). Thus, the control unit 20 superimposes the destination location icon on the image captured using the camera 44 with the size of the destination location icon increased or reduced in accordance with the position of the pixel.

Examples of an image on which the destination location icon is superimposed in the case where half the length of the frontage is less than the maximum error are illustrated on the right side of FIG. 3. Images $I_{11}$, $I_{12}$, and $I_{14}$ illustrated in FIG. 3 are examples of an image displayed on the display section of the user I/F unit 45. The image $I_{11}$ is an example for a case where the error between the estimated position and an actual position $P_{15}$ of the vehicle is zero. That is, in the case where the error between the estimated position and the actual position of the vehicle is zero, a destination location icon $I_d$ is displayed at a position $I_{p1}$ (position as intended from the relationship with the image of the destination location) of an image at the display position $P_{11}$ within a captured image obtained in the case where the display position $P_{11}$ of the destination location icon is captured using the camera 44.

In the case where the error between the estimated position and the actual position of the vehicle is not zero, on the other hand, the destination location icon is not displayed at the position as intended from the relationship with the image of the destination location within the image captured using the camera 44. For example, a case where the actual position of the vehicle is a position $P_{16}$ the maximum error $E_{max}$ on the far side with respect to the estimated position $P_{15}$ of the vehicle is assumed. In this case, the estimated position $P_{15}$ of the vehicle is the same as in the example discussed above. Therefore, as illustrated in the image $I_{12}$, the position $I_{p1}$ at which the destination location icon $I_d$ is displayed within the image captured using the camera 44 is the same position as in the image Because the actual position $P_{16}$ of the vehicle is on the far side with respect to the estimated position $P_{15}$, however, an image Ig of the destination location G within the image $I_{12}$ has been moved toward the end side (near side) of the screen compared to the image Ig of the destination location G within the image $I_{11}$.

Then, in the case of the example illustrated in FIG. 3, the position $P_{11}$ the maximum error $E_{max}$ on the near side from the end point $P_{12}$ of the frontage on the far side is the display position of the destination location icon, and therefore the relative positional relationship between the estimated position $P_{15}$ of the vehicle and the display position $P_{11}$ is equal to the relative positional relationship between the actual position $P_{16}$ of the vehicle and the end point $P_{12}$. Thus, even if the actual position $P_{16}$ of the vehicle is displaced the maximum error $E_{max}$ toward the front with respect to the estimated position $P_{15}$ of the vehicle, as illustrated in the image $I_{12}$ in FIG. 3, the destination location icon is displayed at the end point of the frontage of the destination location on the far side, and the destination location icon is not displayed at a location farther than the end point of the frontage of the destination location on the far side. Therefore, it is possible to suppress the possibility that the user who is heading for the destination location G using the destination location icon in the image $I_{12}$ as a mark passes by the destination location G.

Further, a case where the actual position of the vehicle is a position $P_{17}$ the maximum error $E_{max}$ on the rear side with respect to the estimated position $P_{15}$ of the vehicle is assumed. In this case, the estimated position $P_{15}$ of the vehicle is the same as in the example discussed above. Therefore, as illustrated in the image $I_{14}$, the position $I_{p1}$ at which the destination location icon $I_d$ is displayed within the image captured using the camera 44 is the same position as in the image $I_{11}$. Because the actual position $P_{17}$ of the vehicle is on the rear side with respect to the estimated position $P_{15}$, however, an image Ig of the destination location G within the image $I_{14}$ has been moved toward the center side (far side) of the screen compared to the image Ig of the destination location G within the image $I_{11}$.

Then, if a position $P_{14}$ the maximum error $E_{max}$ on the rear side of the position $P_{11}$ along the road R is assumed in the case of the example illustrated in FIG. 3, the relative positional relationship between the actual position $P_{17}$ of the vehicle and the position $P_{14}$ is equal to the relative positional relationship between the estimated position $P_{15}$ of the vehicle and the display position $P_{11}$. Thus, in the case where the actual position $P_{17}$ of the vehicle is displaced the maximum error $E_{max}$ toward the rear with respect to the estimated position $P_{15}$ of the vehicle, as illustrated in the image $I_{14}$ in FIG. 3, the destination location icon is displayed on the near side with respect to the destination location. In this way, even if the destination location icon is displayed on the near side with respect to the destination location, the destination location icon is displayed at a location around the destination location, and therefore there is a low possibility that the user who is visually recognizing the actual scene passes by the destination location.

Examples of an image on which the destination location icon is superimposed in the case where half the length of the frontage is equal to or more than the maximum error are illustrated on the right side of FIG. 4. Images $I_{21}$, $I_{24}$, and $I_{23}$ illustrated in FIG. 4 are examples of an image displayed on the display section of the user I/F unit 45. The image $I_{21}$ is an example for a case where the error between the estimated position and an actual position $P_{25}$ of the vehicle is zero. That is, in the case where the error between the estimated position and the actual position of the vehicle is zero, a destination location icon $I_d$ is displayed at a position $I_{p2}$ (position as intended from the relationship with the image of the destination location) of an image at the display position $P_{21}$ within a captured image obtained in the case where the display position $P_{21}$ of the destination location icon is captured using the camera 44.

In the case where the error between the estimated position and the actual position of the vehicle is not zero, on the other hand, the destination location icon is not displayed at the position as intended from the relationship with the image of the destination location within the image captured using the camera 44. For example, a case where the actual position of the vehicle is a position $P_{26}$ the maximum error $E_{max}$ on the far side with respect to the estimated position $P_{25}$ of the vehicle is assumed. In this case, the estimated position $P_{25}$ of the vehicle is the same as in the example discussed above. Therefore, as illustrated in the image $I_{24}$, the position $I_{p2}$ at which the destination location icon $I_d$ is displayed within the image captured using the camera 44 is the same position as in the image $I_{21}$. Because the actual position $P_{26}$ of the vehicle is on the far side with respect to the estimated position $P_{25}$, however, an image Ig of the destination location G within the image $I_{24}$ has been moved toward the end side (near side) of the screen compared to the image Ig of the destination location G within the image $I_{21}$.

Then, if a position $P_{24}$ the maximum error $E_{max}$ on the far side of the position $P_{21}$ is assumed in the case of the example illustrated in FIG. 4, the relative positional relationship between the actual position $P_{26}$ of the vehicle and the position $P_{24}$ is equal to the relative positional relationship between the estimated position $P_{25}$ of the vehicle and the display position $P_{21}$. In addition, the position $P_{24}$ is positioned within the frontage. Thus, even if the actual position $P_{26}$ of the vehicle is displaced the maximum error $E_{max}$ toward the front with respect to the estimated position $P_{25}$ of the vehicle, as illustrated in the image $I_{24}$ in FIG. 4, the destination location icon is displayed within the frontage of the destination location. Therefore, it is possible to suppress the possibility that the user who is heading for the destination location G using the destination location icon in the image $I_{24}$ as a mark passes by the destination location G.

Further, a case where the actual position of the vehicle is a position $P_{27}$ the maximum error $E_{max}$ on the rear side with respect to the estimated position $P_{25}$ of the vehicle is assumed. In this case, the estimated position $P_{25}$ of the vehicle is the same as in the example discussed above. Therefore, as illustrated in the image $I_{23}$, the position $I_{p2}$ at which the destination location icon $I_d$ is displayed within the image captured using the camera 44 is the same position as in the image $I_{21}$. Because the actual position $P_{27}$ of the vehicle is on the rear side with respect to the estimated position $P_{25}$, however, an image Ig of the destination location G within the image $I_{23}$ has been moved toward the center side (far side) of the screen compared to the image Ig of the destination location G within the image $I_{21}$.

Then, in the case of the example illustrated in FIG. 4, the position $P_{21}$ the maximum error $E_{max}$, on the far side from the end point $P_{23}$ of the frontage on the near side is the display position of the destination location icon, and therefore the relative positional relationship between the estimated position $P_{25}$ of the vehicle and the display position $P_{21}$ is equal to the relative relationship between the actual position $P_{27}$ of the vehicle and the end point $P_{23}$. Thus, in the case where the actual position $P_{27}$ of the vehicle is displaced the maximum error $E_{max}$ toward the rear with respect to the estimated position $P_{25}$ of the vehicle, as illustrated in the image $I_{23}$ in FIG. 4, the destination location icon is displayed at the end point of the destination location on the near side. Therefore, it is possible to suppress the possibility that the user who is heading for the destination location G using the destination location icon in the image $I_{23}$ as a mark passes by the destination location G. As has been described above, in the case where half the length of the frontage is equal to or more than the maximum error, the destination location icon can be displayed within the frontage no matter what value the error has. Further, the center of the range in which the destination location icon may be displayed is the position of the center of the frontage or a position on the rear side with respect to the center of the frontage. Thus, it is possible to allow the user to focus on the destination location icon early within the image which illustrates the scene in front of the vehicle, which facilitates the user reaching the destination location.

(3) Other Embodiments

A variety of other embodiments can be adopted. For example, the navigation system 10 may be fixedly mounted on the vehicle, or may be a portable navigation system 10 that can be brought into the vehicle to be utilized. In addition, a variety of forms other than a four-wheeled vehicle may be assumed for the mobile body, and the mobile body may be a two-wheeled vehicle, or may be a pedestrian. In the case where the mobile body is a pedestrian, the pedestrian may carry the navigation system 10 which incorporates the GPS receiver 41, the camera 44, and so forth.

Further, it is only necessary that the image displayed on the display section of the user I/F unit 45 should be an image in which the destination location icon is superimposed on the image of the scene, and another image may be included in the image. For example, a map around the road on which the mobile body is present may be included in the image.

Further, besides a location on the boundary line between the destination location and the road, the display position of the destination location icon may be a position a predetermined distance displaced from the boundary line toward the destination location in a direction that is perpendicular to the road, or may be a location on the road. In the case where a sidewalk is present, in addition, the display position of the destination location icon may be a location on the sidewalk, or may be a location on a boundary line between the sidewalk and the destination location.

In the navigation system, further, it is only necessary that an image in which the destination location icon which indicates the destination location is superimposed on the scene in front of the mobile body should be able to be displayed on the display section. The scene may be the actual scene, or may be a picture that depicts the scene. The former can be implemented by generating an image using a camera that captures the scene in front of the mobile body, and the latter can be implemented by generating an image that depicts features such as buildings and roads that are present in front of the mobile body. It is only necessary that the destination location icon should be superimposed on the scene to indicate the destination location, and can be constituted of an image of a flag, an arrow, or the like.

It is only necessary that the frontage length acquisition means should be able to acquire the length of the frontage of the destination location along the road on which the mobile body is present. That is, it is only necessary that the frontage length acquisition means should be able to acquire the length of the frontage of the destination location along the road on which the mobile body is present as an index for preventing the destination location icon from being displayed on the far side with respect to the destination location. Thus, it is only necessary that the length of the frontage should be defined so as to suppress the possibility that the destination location icon is displayed on the far side with respect to the destination location. The length of the frontage may be specified as the length of a side over which the road on which the mobile body is present and the site of the destination location contact each other, or may be specified by estimating the length of the frontage.

It is only necessary that the maximum error acquisition means should be able to acquire a maximum error which is the maximum value of an error between an estimated position and the actual position of the mobile body that may be caused in the direction of the road on which the mobile body is present. That is, in the technology for specifying an estimated position of the mobile body for route guidance or the like, the estimated position and the actual position may be different from each other, and an error may be caused in the direction of the road on which the mobile body is present in accordance with the difference between the positions. The maximum value of the error can be estimated in accordance with a rule decided in advance.

For example, in the case where an estimated position is specified on the basis of GPS signals, the accuracy in estimated position is varied in accordance with the status of reception of GPS signals (the intensity of the signals, the number of satellites from which the signals can be acquired, and the surrounding buildings) etc. In addition, in the case where the map matching process is performed on the basis of the estimated position estimated using the vehicle speed sensor and the gyro sensor, it can be considered that the accuracy in estimated position is increasingly reduced as the elapsed time after passage through a specific road shape (such as a curve) is longer. Further, in a configuration in which a known feature (such as a paint on the road surface) is captured using a camera and an estimated position of the mobile body is specified on the basis of the captured image, it can be considered that the accuracy in estimated position is increasingly reduced as the elapsed time after the estimated position is specified is longer. Thus, the maximum value of the error can be estimated in advance on the basis of such various types of factors of the error. It is only necessary that the maximum error acquisition means should be able to acquire a maximum error as a result of the estimation. The maximum error may be a fixed value decided in advance, or may be a value varied in accordance with the status of reception of GPS signals or the like.

An error may be caused toward either the front or the rear in the direction of the road on which the mobile body is present. In general, however, it is often not clear in what direction an error is caused. In this case, preferably, only the magnitude of the error is defined without prescribing the direction of the error on the road on which the mobile body is present. For example, in the case where the maximum error is 1 m, it is assumed that there is an error of up to 1 m toward either the front or the rear in the direction of the road on which the mobile body is present.

It is only necessary that the display position specifying means should be able to specify the display position of the destination location icon on the basis of the estimated position of the mobile body such that the display position of the destination location icon is a position within the frontage in the case where the error is zero, and such that the display position of the destination location icon is a position within the frontage or a position nearer than the destination location in the case where the error is the maximum error. That is, in the case where the display position is specified such that the destination location icon is displayed within the frontage of the destination location on the basis of the estimated position, the destination location icon is displayed within the frontage of the destination location if no error is caused between the estimated position and the actual position of the mobile body. In the case where an error is caused between the estimated position and the actual position of the mobile body, however, the display position of the destination location icon is not located at the intended position, and displaced in the front-rear direction of the road on which the mobile body is present. Thus, by specifying the display position of the destination location icon on the basis of the estimated position of the mobile body such that the display position of the destination location icon is a position within the frontage or a position nearer than the destination location in the case where the error is the maximum error, it is possible to suppress the possibility that the destination location icon is displayed at a position farther than the destination location.

A variety of configurations can be adopted for the position of the frontage of the destination location, and the position of the frontage may be specified from the position of the destination location and the shape of the site of the destination location, or may be prescribed in advance as the map information. In any event, it is only necessary that the position of the frontage should be specified from the relative relationship between the estimated position of the mobile body and the destination location so that the display position for a case where the error is zero is specified. Then, by assuming displacement in display position for a case where the error is the maximum error from the length and the position of the frontage, the display position of the destination location icon can be specified such that the display position of the destination location icon is a position within the frontage or a position nearer than the destination location in the case where the error is the maximum error. The near side indicates the rear side in the travel direction of the mobile body on the road on which the mobile body is present, and the far side indicates the front side in the travel direction of the mobile body on the road on which the mobile body is present. In addition, the position within the frontage is a position inside the frontage of the destination location, and is therefore a position between the end points, on the front side and the rear side, of the destination location which is present along the road on which the mobile body is present. Further, the position nearer than the destination location is a position further on the rear side with respect to the end point, on the rear side, of the destination location which is present along the road on which the mobile body is present, and the position farther than the destination location is a position further on the front side with respect to the end point, on the front side, of the destination location which is present along the road on which the mobile body is present.

It is only necessary that the image display means should be able to display, on the display section, an image in which the destination location icon is superimposed on the display position of the destination location icon in the scene in front of the mobile body. That is, it is only necessary that by superimposing the destination location icon on the display position, the user can be guided using the destination location icon at least such that the mobile body does not reach a location farther than the destination location.

Further, as a configuration example for specifying the display position, the display position specifying means may be configured to determine a position the maximum error on the near side from the end point of the frontage on the far side in the direction of the road on which the mobile body is present as the display position of the destination location icon in the case where half the length of the frontage is less than the maximum error. That is, in general, it is often not clear toward which of the front and the rear an error is caused in the direction of the road on which the mobile body is present. Thus, if the center of the frontage of the destination location is determined as the display position of the destination location icon, there is a high possibility that the destination location icon is displayed within the frontage no matter toward which of the front and the rear an error is caused.

In the case where half the length of the frontage of the destination location is less than the maximum error, however, there may be a case where the destination location icon is not displayed within the frontage of the destination location even if the center of the frontage of the destination location is determined as the display position of the destination location icon. Thus, in the case where half the length of the frontage is less than the maximum error, a position the maximum error on the near side from the end point of the frontage on the far side in the direction of the road on which the mobile body is present is determined as the display position of the destination location icon. According to the configuration, the destination location icon is displayed at the end point of the frontage on the far side even if the maximum error is caused on the far side, and the destination location icon is displayed at a position nearer than the frontage in the case where the maximum error is caused on the near side.

Further, as a configuration example for specifying the display position, the display position specifying means may be configured to determine a position the maximum error on the far side from the end point of the frontage on the near side in the direction of the road on which the mobile body is present as the display position of the destination location icon in the case where half the length of the frontage is equal to or more than the maximum error. According to the configuration, the destination location icon is displayed at the end point of the frontage on the near side even if the maximum error is caused on the near side, and the destination location icon is displayed within the frontage in the case where the maximum error is caused on the far side. Thus, the destination location icon can be displayed within the frontage no matter what value the error has. Further, the center of the range in which the destination location icon may be displayed is the position of the center of the frontage or a position on the near side with respect to the center of the frontage. Thus, it is possible to allow the user to focus on the destination location icon early within the image which illustrates the scene in front of the mobile body, which facilitates the user reaching the destination location. As a matter of course, in the case where half the length of the frontage is equal to or more than the maximum error, the display position of the destination location icon can be determined as another position, and the center of the frontage of the destination location may be determined as the display position of the destination location icon.

Further, as a configuration example for specifying the end points of the frontage, the display position specifying means may specify the end points of the frontage on the basis of site shape data that indicate the shape of the site of the destination location in the case where such site shape data are present, and the display position specifying means may specify, as the end points of the frontage, positions half the length of the frontage prescribed in advance for the destination location away from the coordinate of the destination location toward the far side and the near side in the direction of the road on which the mobile body is present in the case where site shape data on the destination location are not present.

The site shape data are data defined so as to specify the shape of the site of the destination location. It is considered that the site shape data are present in the case where the site shape data are stored in a storage medium that can be referenced by the drive assist system. Then, in the case where the site shape data are present, the shape of the site of the destination location can be specified on the basis of the site shape data, and it is only necessary that the length of the frontage and the end points of the frontage should be specified on the basis of the shape of the site. As a matter of course, it is only necessary that the site shape data should be defined so as to be capable of specifying at least the shape of the site of the destination location, and the site shape data may be polygon data defined so as to be capable of specifying the shape of the site as the three-dimensional shape of the destination location is specified.

In the case where the site shape data are not present, on the other hand, the shape of the frontage cannot be accurately specified. In this case, by specifying the length of the frontage, positions half the length of the frontage away from the center of the frontage of the destination location toward the far side and the near side in the direction of the road on which the mobile body is present can be considered as the end points of the frontage. Thus, the end points of the frontage can be specified without defining site shape data for all the destination locations.

In this case, it is only necessary that the length of the frontage should be prescribed in advance, and that information that indicates the length should be stored in a storage medium that can be referenced by the drive assist system. In addition, the length of the frontage may be defined for each destination location, and the length of the frontage may be estimated from the attribute of the destination location. For the latter, the length of the frontage may be prescribed in advance for each type of the destination location. That is, each destination location may be correlated in advance with information that indicates the type of the destination location, and when displaying a destination location icon for a desired destination location, the length of the frontage may be specified from the type of the destination location to specify the end points of the frontage.

Further, the technique of specifying the display position of the destination location icon such that the display position of the destination location icon is a position within the frontage or a position nearer than the destination location in the case where the error is the maximum error can also be implemented as a program or a method. In addition, it can be assumed that the system, program, and method described above are implemented as a single device, implemented by a plurality of devices, or implemented utilizing parts that are common to various portions provided in the vehicle, and the system, program, and method include a variety of aspects. For example, a navigation system, method, and program that include the device described above can be provided. Various changes may be made as appropriate. For example, some units may be implemented using software, and the others may be implemented using hardware. Further, embodiments may be implemented as a storage medium for a program that controls the system. As a matter of course, the storage medium for the software may be a magnetic storage medium or a magneto-optical storage medium. Furthermore, any storage medium that may be developed in the future can also be considered to be exactly the same.

The invention claimed is:

1. A drive assist system that displays an image in which a destination location icon that indicates a destination location is superimposed on a scene in front of a mobile body, comprising:
    a display;
    a memory that stores a drive assist program; and
    a processor that, when executing the stored program:
        acquires a length of a frontage of the destination location along a road on which the mobile body is present;
        acquires a maximum error, which is a maximum value of an error between an estimated position of the mobile body and an actual position of the mobile body that may be caused in a direction of the road on which the mobile body is present; and
        specifies the display position of the destination location icon on the basis of the estimated position of the mobile body such that:
            the display position of the destination location icon is a position within the frontage when the error is zero; and
            the display position of the destination location icon is a position within the frontage or a position nearer than the destination location when the error is the maximum error; and
        displays, on the display, an image in which the destination location icon is superimposed on the display position of the destination location icon in the scene in front of the mobile body.

2. The drive assist system according to claim 1, wherein the processor, when executing the stored program:
    specifies the display position of the destination location icon on the basis of the estimated position of the mobile body such that the display position of the destination location icon is a position within the frontage or a position nearer than the destination location even if an error is caused between the estimated position and an actual position of the mobile body in a direction of the road on which the mobile body is present.

3. The drive assist system according to claim 1, wherein the processor, when executing the stored program:
    the display position specifying means determines a position the maximum error on a near side from an end point of the frontage on a far side in the direction of the road on which the mobile body is present as the display position of the destination location icon when half the length of the frontage is less than the maximum error.

4. The drive assist system according to claim 1, wherein the processor, when executing the stored program:
    determines a position of the maximum error on a far side from an end point of the frontage on a near side in the direction of the road on which the mobile body is present as the display position of the destination location icon when half the length of the frontage is equal to or more than the maximum error.

5. The drive assist system according to claim 1, wherein the processor, when executing the stored program:
    specifies end points of the frontage on the basis of site shape data that indicates a shape of a site of the destination location when such site shape data is present; and
    specifies, as the end points of the frontage, positions half the length of the frontage prescribed in advance for the destination location away from a center of the frontage of the destination location toward a far side and a near side in the direction of the road on which the mobile body is present when the site shape data is not present.

6. The drive assist system according to claim 1, wherein:
    the length of the frontage is prescribed in advance for each type of the destination location.

7. A drive assist method for displaying, on a display, an image in which a destination location icon that indicates a destination location is superimposed on a scene in front of a mobile body, comprising:
    acquiring a length of a frontage of the destination location along a road on which the mobile body is present;
    acquiring a maximum error, which is a maximum value of an error between an estimated position of the mobile body and an actual position of the mobile body that may be caused in a direction of the road on which the mobile body is present; and
    specifying the display position of the destination location icon on the basis of the estimated position of the mobile body such that:
        the display position of the destination location icon is a position within the frontage when the error is zero; and
        the display position of the destination location icon is a position within the frontage or a position nearer than the destination location when the error is the maximum error; and
    displaying, on the display, an image in which the destination location icon is superimposed on the display position of the destination location icon in the scene in front of the mobile body.

8. A computer-readable storage medium storing a computer-executable drive assist program for displaying, on a display, an image in which a destination location icon that indicates a destination location is superimposed on a scene in front of a mobile body, the program comprising:
    instructions for acquiring a length of a frontage of the destination location along a road on which the mobile body is present;
    instructions for acquiring a maximum error, which is a maximum value of an error between an estimated position of the mobile body and an actual position of the mobile body that may be caused in a direction of the road on which the mobile body is present; and instructions for specifying the display position of the destination location icon on the basis of the estimated position of the mobile body such that:
- the display position of the destination location icon is a position within the frontage when the error is zero; and
- the display position of the destination location icon is a position within the frontage or a position nearer than the destination location when the error is the maximum error; and instructions for displaying, on the display, an image in which the destination location icon is superimposed on the display position of the destination location icon in the scene in front of the mobile body.

* * * * *